United States Patent [19]

Wang et al.

[11] 4,360,615

[45] Nov. 23, 1982

[54] ADDITION AGENT COMPOSITION

[75] Inventors: Samuel S. Wang, Cheshire; Morris E. Lewellyn, Stamford, both of Conn.

[73] Assignee: American Cyanamid Company, Stamford, Conn.

[21] Appl. No.: 241,908

[22] Filed: Mar. 9, 1981

[51] Int. Cl.³ .................. C08L 95/00; C21C 7/04; C22B 9/00
[52] U.S. Cl. .......................... 524/9; 523/142; 523/145; 523/400; 524/13; 524/15; 524/59; 524/270; 524/401; 524/439; 260/97.5; 260/104; 264/111; 264/117; 75/53; 75/58; 75/93 A; 75/93 F; 75/130 R; 75/256; 75/257
[58] Field of Search .................. 260/9, 18 EP, 97.5, 260/104; 264/111, 117; 75/130 R, 53, 58, 256, 257, 93 A, 93 F, 93 G; 523/139, 142, 145, 400; 524/9, 13, 15, 59, 270, 401, 439, 440, 441, 442, 445

[56] References Cited

U.S. PATENT DOCUMENTS

| 145,580 | 12/1873 | Mackay | 75/93 A |
|---|---|---|---|
| 2,306,352 | 12/1939 | Burrell | 260/97.5 |
| 2,671,019 | 3/1954 | Du Rostu | 75/256 |
| 3,134,759 | 5/1964 | Kirkpatrick et al. | 260/97.5 |
| 3,814,789 | 6/1974 | Cox | 264/117 |
| 4,199,351 | 4/1980 | El Gammal | 75/130 R |
| 4,217,133 | 8/1980 | Goto et al. | 75/130 R |
| 4,225,343 | 9/1980 | Guarino et al. | 75/130 R |

FOREIGN PATENT DOCUMENTS 1080129 4/1960 Fed. Rep. of Germany ........ 75/936

*Primary Examiner*—John Kight, III
*Assistant Examiner*—Nathan M. Nutter
*Attorney, Agent, or Firm*—Michael J. Kelly; Paul W. Leuzzi, II

[57] ABSTRACT

Modified tall oil pitch is blended with a metallurgical addition agent and briquetted, extruded, molded, pelletized, or tabletized into a unitary composition. The tall oil pitch is modified chemically to increase the molecular weight and improve the binding properties.

29 Claims, No Drawings

ADDITION AGENT COMPOSITION

BACKGROUND OF THE INVENTION

The term addition agent is generally used to describe any of the materials added to molten steel to effect a desirable composition or property. Addition agents are also widely used in non-ferrous alloys to affect the composition or property of the alloy. Characteristic of these desirable ends are deoxidation of the molten metal, control of grain size, increased corrosion resistance, increased heat resistance and improvement of the mechanical and physical properties, to name but a few.

The more common addition agents include aluminum, boron, calcium, chromium, niobium, manganese, molybdenum, nitrogen, phosphorus, selenium, silicon, tantalum, titanium, tungsten vanadium, and zirconium; these addition agents are generally added as an alloy with iron and are therefore referred to as ferroalloys. Others are added as pure metals, such as aluminum, calcium, cobalt, copper, manganese and nickel. Still others are added as oxides, such as molybdenum, nickel and tungsten. Some rare-earth alloys are also used in special instances.

Addition agents may be added with the charge in the furnace, in the molten bath near the end of the finishing period, in the ladle, or in the molds. Timing of the alloy addition depends upon the effect addition will have on the temperature of the molten metal, the ease with which the addition agent goes into solution, susceptibility of the addition agent to oxidation and formation and elimination of reaction products.

The instant invention is directed to composition used in compacting the addition agent for introduction into the metallurgical operations, such as steel manufacturing. Compaction has variously been carried out by briquetting, extruding, molding, pelletizing, or tabletizing the addition agent can more easily be handled and fed into the furnace or other metallurgical stage than the uncompacted addition agent.

Both organic and inorganic binding additives have been incorporated with addition agents to assist in this compaction stage. Generally, compaction has carried out employing petroleum based pitch binders of which asphalt pitch appears to be the industry's preference. Unfortunately, these petroleum based pitch binders are often characterized by high solid failure rates, low abrasion resistance and a tendency to produce high levels of dust during the dry mixing operations. Although the industry has experimented with other binders, such as tall oil pitch as described in U.S. Pat. No. 3,814,789; dextrin as described in U.S. Pat. No. 2,726,152; and alcohols as described in U.S. Pat. No. 3,340,024, these binders have either proven too expensive or lacking the requisite properties to be effective in compaction.

Accordingly, the industry continues in its need for a novel binder that can at once overcome the difficulties inherent in petroleum based binders and yet exhibit the properties necessary to be effective in compaction.

SUMMARY OF THE INVENTION

The instant invention provides a novel addition agent composition which comprises a blend of an addition agent with a modified tall oil pitch binder wherein the modified tall oil pitch binder comprises an organic or inorganic filler and a tall oil pitch that has been chemically modified with a polycarboxylic acid, a polyamine, a polyol, a polyisocyanate, an epoxy resin, or a combination thereof. The resultant addition agent composition requires less compacting pressure to effect a unitary structure, exhibits improved performance properties, is relatively inexpensive to prepare and is effective in metallurgical properties.

DETAILED DESCRIPTION OF THE INVENTION

In accordance with the instant invention there is provided a novel addition agent composition useful in metallurgical operations. Generally speaking, the metallurgical operation is the manufacture of some ferrous or nonferrous alloy such as steel. The addition agents introduced into the metallurgical operation include, but are not limited to, aluminum, boron, calcium, chromium, cobalt, copper, manganese, molybdenum, or molybdenum oxides, nickel or nickel oxides, niobium, nitrogen, phosphorus, selenium, silicon, tantalum, titanium, tungsten or tungsten oxides, vanadium, zirconium and various rare-earth alloys.

The addition agents are introduced into the metallurgical operation after having been compacted with a suitable binder. In the instant invention, the binder is a mixture of an organic or inorganic filler and a tall oil pitch which has been chemically modified. Suitable organic or inorganic fillers must not interfere with the metallurgical operations and yet must impart a degree of loading to the compacted structure. Such fillers include, but are not necessarily limited to, saw dust, activated carbon black, wood flour, walnut shells, silicon, clay and the like.

Tall oil pitch is the residue remaining after the distillation and fractionation of tall oil, the tall oil being a major by-product of the kraft or sulfate pulping process. Tall oil is a mixture of rosin and fatty acids with various unsaponifiables and is obtained by the acidification of the rosin and fatty acid sodium soaps recovered from the concentrated black liquor in the pulping process. The tall oil pitch contains decomposition products of these rosin and fatty acids, such as rosin anhydrides, estolides and hydrocarbons resulting from the dehydration and decarboxylation of the rosin and fatty acids. Additionally, the tall oil pitch may contain varying amounts of hydroxy acids of the rosin and fatty type, higher alcohols, sterols, hydrocarbons and sulfur lignin. Since the component composition may vary by as much as fifteen percent between different tail oil pitches, unmodified tall oil pitch, when used as a binder component, can often result in an unacceptable binder. Surprisingly, it has now been discovered that by chemically modifying the tall oil pitch to effect chain extension and/or branching so that the modified tall oil pitch meets certain physical requirements, the resultant composition can be effectively employed in the instant invention to obtain increased performance and a lowering of the compacting pressure necessary to obtain the compacted structure containing the addition agents.

Modification of the tall oil pitch is effected by mixing therewith either a polycarboxylic acid, a polyamine, a polyol, a polyisocyanate, an epoxy resin or a combination thereof in an amount equal to about 5 to 75 weight percent of the tall oil pitch, preferably about 10 to 30 weight percent thereof. The mixture is vigorously stirred for 1 to 20 hours at a temperature in the range of 150° to 300° C., preferably from 2 to 5 hours at a temperature in the range of 225° to 275° C.

Suitable polycarboxylic acids include, but are not limited to, maleic anhydride, succinic anhydride, phthalic anhydride, succinic acid, adipic acid, azelaic acid, isophthalic acid, trimellitic acid, oxalic acid, malonic acid, trimesic acid, hemimellitic acid, isophthalic acid, suberic acid, pimelic acid, maleic anhydride/ethylenic copolymers and the like.

Suitable polyamines include, but are not limited to, ethylene diamine, diethylene triamine, hexamethylene diamine, methylenebisphenylene diamine, dibenzylamine, diamino naphthalene, tetramethylenediamine, phenylenediamine and the like.

Suitable polyols include, but are not limited to, ethylene glycol, propylene glycol, pentaerythritol, dipentaerythritol, polypropylene glycol, butanediol, pinacol, butylene diglycol, trimethylol propane, styrene/allylalcohol copolymers and the like.

Suitable polyisocyanates include, but are not limited to, methylene diphenylene diisocyanate, toluene diisocyanate, hexamethylene diisocyanate, naphthalene diisocyanate, methylene dicyclohexyldiisocyanate and the like.

Suitable epoxy resins include, but are not limited to, diglycidyl ethers derived from bisphenol A and epichlorohydrin, cresol-novolac epoxy resin, phenol novolac resin, cycloalicyclic epoxy resin, aromatic glycidyl amino resin, and the like.

To this modified tall oil pitch there is added the filler in an amount to from about 1 to 50 weight percent of the modified tall oil pitch, preferably about 5 to 30 weight percent. The resulting binder should have a softening point between 30° to 125° C., preferably 55° to 85° C. and depending on the modifying agent employed, it should contain polyamide, polyester, and/or polyurethane structure moieties.

The modified tall oil pitch binder is then heated above its softening point to form what is conventionally termed a "hot melt". To this hot melt there is blended the addition agent or agents preferably such that the binder is less than fifty weight percent. If necessary, an appropriate organic solvent, such as a ketone or alcohol, can be added to assist in the blending. The blended composition can then be subjected to a compacting pressure by briquetting, extruding, molding, pelletizing, or tabletizing the blend into a unitary structure. The compacting pressure presently used in the industry is on the order of 17,000 psi; however, experimental results indicate that effective unitary structures can be achieved employing substantially lower pressures. The unitary structure would then be fed into the appropriate stage in the metallurgical operation to effect the desired composition or property, such as preparing an alloy, deoxidizing the molten metal, increasing heat resistace or the like.

Whereas the exact scope of the instant invention is set forth in the appended claims, the following specific examples illustrate certain aspects of the present invention and, more particularly, point out methods of evaluating the same. However, the examples are set forth for illustration only and are not to be construed as limitations on the present invention except as set forth in the appended claims. All parts and percentages are by weight unless otherwise specified.

EXAMPLE 1

31.7 Parts of maleic anhydride are added to 316.6 parts of tall oil pitch (Acid No.=36.4 mg KOH/g; saponification no. =47.6 mg KOH/g.; softening point=32° C.) at 150° C. with vigorous stirring. The temperature is raised to 250° C. and maintained at 250° C. for 2 hours. The acid number is 52.7 mg KOH/g. The reaction mixture is then cooled to 150° C. and 24 parts of diethylenetriamine is added. The temperature is raised to 250° C. and maintained at 250° C. for 14 hours. The acid number is 13.6 mg KOH/g. The mixture is cooled to 150° C. and 54 parts of wood flour are added. The mixture is stirred at 150° C. for 2 hours. The product has a softening point of 76° C.

EXAMPLE 2

30 Parts of pentaerythritol and 0.1 part of concentrated sulfuric acid are added to 300 parts of tall oil pitch at 150° C. with vigorous stirring. The temperature is raised to 250° C. and maintained at 250° C. for 5 hours. The acid number is 10.9 mg KOH/g. The mixture is then cooled to 110° C. and 0.1 part of sodium carbonate is added. To this mixture is added 33 parts of methylene diphenylene diisocyanate and 0.5 part of 1,4-diazobicyclo(2.2.2)octane. The mixture is stirred at 110° C. for 2 hours. The softening point is 60.5° C.

EXAMPLE 3

26 Parts of pentaerythritol and 0.1 part of concentrated sulfuric acid are added to 260 parts of tall oil pitch at 150° C. with vigorous stirring. The temperature is raised to 250° C. and maintained at 250° C. for 5 hours. The acid number is 10.9 mg KOH/g. The mixture is then cooled to 150° C. and 85 parts of 1:1 styrene/maleic anhydride copolymer, molecular weight of 1600 is added. The temperature is then raised to 250° C. and stirred at 250° C. for 5 hours. The acid number is 4.2 mg KOH/g. The temperature is cooled to 150° C. and 36 parts of wood flour are added. The mixture is stirred for 2 hours. The softening point is 58° C.

EXAMPLE 4

23 Parts of maleic anhydride are added to 230 parts of tall oil pitch at 150° C. with vigorous stirring. The temperature is raised to 250° C. and maintained at 250° C. for 4 hours. An acid number of 51.7 mg KOH/g. is obtained. The mixture is cooled to 150° C. and 25 parts of a diglycidyl ether derived from bisphenol A and epichlorohydrin (epoxide equivalent of 2000 to 2500) is added. The mixture is heated to 250° C. for 6 hours. An acid number of 30.3 mg KOH/g. is obtained. The mixture is then cooled to 150° C. and 29 parts of wood flour is added and the resulting mixture stirred for 2 hours at 150° C. The softening point is 77.5° C.

EXAMPLE 5

30 Parts of a 1:1 styrene/maleic anhydride copolymer having a molecular weight of 1600 are added to 296 parts of tall oil pitch at 150° C. with vigorous stirring. The temperature is raised to 250° C. and maintained at 250° C. for 4 hours. An acid number of 28.6 mg KOH/g. is obtained. The mixture is then cooled to 150° C. and 17 parts of diethylenetriamine is added. The temperature is raised to 250° C. and maintained at 250° C. for 6 hours. An acid number of 4.7 mg KOH/g. is obtained. The mixture is finally cooled to 150° C. and 50 parts of wood flour is added and the mixture is stirred at 150° C. for 2 hours. A softening point of 57° C. is obtained.

EXAMPLE 6

33 Parts of maleic anhydride are added to 328 parts tall oil pitch at 150° C. with vigorous stirring. The temperature is raised to 200° C. and maintained at 200° C. for 2 hours. An acid number of 58.9 mg KOH/g. is obtained. The mixture is then cooled to 150° C. and 36 parts of a 1:1 copolymer of styrene and allyl alcohol having a molecular weight of about 2,000 to 4,000 is added. The temperature is raised to 200° C. and maintained at 200° C. for 6 hours. An acid number of 30.9 mg KOH/g. is obtained. The mixture is again cooled to 150° C. and 39 parts of wood flour is added. The mixture is stirred at 150° C. for 2 hours. A softening point of 62° C. is obtained.

GENERAL PROCEDURE

Fourteen parts of a binder composition are weighed into a suitable vessel which, in turn, is placed on a hot plate and heated above the binder's softening point. Once a hot melt is obtained, eighty-six parts of an addition agent are added stepwise to the hot melt with continuous agitation. The resultant blend is a wet, but free flowing material, granular in nature.

The blend is divided into portions weighing 20 parts each. Each portion is placed in a 1¼" die and then cold pressed at the desired compaction pressure. A releasing agent is recommended for the compaction stage to aid in the removal of the final product. The compacted portion is then tested for physical properties.

The physical properties are assessed in a diametral compression test. In this test, the tensile strength may be calculated from:

$$t = 2w/\pi LD$$

where t is the tensile strength, W is the applied load, L is the thickness and D is the diameter of the test specimen. The tests were conducted in a machine equipped with a compressive loading cell of 200 lbs. capacity. The specimens were loaded at a crosshead speed of 0.05"/minute and a chart speed of 5"/minute. All tests were run at 23° C. and 50% relative humidity.

The relative plasticity of the specimens are assessed from its deformation at failure. Deformation at failure being estimated from the length of the peak of the load versus time curve. The deflection index was defined as the ratio of the deflection at failure versus that of a standard specimen binded with asphalt (14–15% by weight) at 16,000 psig.

COMPARATIVE EXAMPLES A AND B

Following the General Procedure in every material detail except that 10 parts of an unmodified tall oil pitch binder is employed with 90 parts of the addition agent test results are set forth in Table I. It should be noted that higher concentration of unmodified tall oil pitch produced a mixture that did not form briquettes upon being compressed. The use of 10 parts of unmodified tall oil pitch is the optimum concentration for briquette formation.

TABLE I

| | Molybdenum Oxide Addition Agents | | | |
|---|---|---|---|---|
| Example | Softening Point, °C. | Compaction Pressure, psig | Tensile Strength lbs/in. | Deflection Index |
| Asphalt Pitch | 110 | 16,000 | 160 | 1 |
| 1 | 76 | 4,200 | 294 | 10 |
| 2 | 60.5 | 4,200 | 180 | 28 |
| 3 | 58 | 12,000 | 160 | 24 |
| 4 | 77.5 | 30,000 | 160 | 13 |
| 5 | 57 | 4,200 | 195 | 21 |

TABLE I-continued

| | Molybdenum Oxide Addition Agents | | | |
|---|---|---|---|---|
| Example | Softening Point, °C. | Compaction Pressure, psig | Tensile Strength lbs/in. | Deflection Index |
| 6 | 62 | 4,200 | 177 | 24 |
| Comparative A | | 4,200 | 14 | — |
| Comparative B | | 8,000 | 12 | — |

TABLE II

| Performance Properties of Molybdenum Oxide Briquette With 14% Example 1 Binder | | | | | |
|---|---|---|---|---|---|
| Weight (grams) | Thickness (cm) | Compaction Pressure (psig) | Bulk Density (gm/cc) | Load at Rupture (lbs) | Deflection at Failure (inches) |
| 19.919 | 1.390 | 4,200 | 2.826 | 103.0 | 0.25 |
| 20.042 | 1.390 | 4,200 | 2.846 | 99.0 | 0.31 |
| 19.986 | 1.340 | 8,000 | 2.943 | 146.0 | 0.33 |
| 19.926 | 1.335 | 8,000 | 2.946 | 147.8 | 0.35 |
| 19.826 | 1.325 | 10,000 | 2.953 | 157.0 | 0.30 |

EXAMPLE 7

Following the procedure of Example 1, isophthalic acid is substituted for the maleic anhydride and sawdust is substituted for the wood flour. Eight parts of the final product are blended with 92 parts of a nickel oxide addition agent according to the General Procedure. A composition results that can be compacted and effectively employed in metallurgical operations.

EXAMPLE 8

Following the procedure of Example 2, butanediol is substituted for the pentaerythritol and activated carbon black is substituted for the sodium carbonate. Twenty-five parts of the final product are blended with 75 parts of a chromium addition agent according to the General Procedure. A composition results that can be compacted and effectively employed in metallurgical operations.

EXAMPLE 9

Following the procedure of Example 5, phenylenediamine is substituted for diethylenetriamine and silicon is substituted for wood flour. 33 Parts of the final product are blended with 67 parts of a titanium addition agent according to the General Procedure. A composition results that can be compacted and effectively employed in metallurgical operations.

We claim:

1. An addition agent composition which comprises a blend of an addition agent with a modified tall oil pitch binder wherein the modified tall oil pitch binder comprises an organic or inorganic filler and a tall oil pitch that is chemically modified with a polycarboxylic acid, a polyamine, a polyol, a polyisocyanate, an epoxy resin or a combination thereof.

2. The composition of claim 1 wherein the addition agent is selected from the group consisting of aluminum, boron, calcium, chromium, cobalt, copper, manganese, molybdenum, molybdenum oxide, nickel, nickel oxide, niobium, nitrogen, phosphorus, selenium, silicon, tantalum, titanium, tungsten, tungsten oxide, vanadium, zirconium, and rare-earth alloys.

3. The composition of claim 2 wherein the addition agent is molybdenum oxide.

4. The composition of claim 1 wherein the filler is selected from the group consisting of sawdust, activated carbon black, wood flour, walnut shells, silicon and clay.

5. The composition of claim 4 wherein the filler is wood flour.

6. The composition of claim 1 wherein the tall oil pitch is chemically modified with maleic anhydride and diethylene triamine.

7. The composition of claim 1 wherein the tall oil pitch is chemically modified with pentaerythritol and methylene diphenylene diisocyanate.

8. The composition of claim 1 wherein the tall oil pitch is chemically modified with pentaerythritol and a styrene/maleic anhydride copolymer.

9. The composition of claim 1 wherein the tall oil pitch is chemically modified with maleic anhydride and diglycidyl ether.

10. The composition of claim 1 wherein the tall oil pitch is chemically modified with a styrene/maleic anhydride copolymer and diethylene triamine.

11. The composition of claim 1 wherein the tall oil pitch is chemically modified with maleic anhydride and a styrene/allyl alcohol copolymer.

12. The composition of claim 1 wherein the filler constitutes an amount equal to from about 1 to 50 weight percent of the modified tall oil pitch.

13. The composition of claim 12 wherein the filler constitutes an amount equal to from about 5 to 30 weight percent of the modified tall oil pitch.

14. The composition of claim 1 wherein the modified tall oil pitch binder has a softening point between 30° C. and 125° C.

15. The composition of claim 14 wherein the modified tall oil pitch binder has a softening point between 55° C. and 85° C.

16. The composition of claim 1 wherein the modified tall oil pitch binder constitutes less than 50 weight percent of the addition agent composition.

17. An addition agent composition which comprises a blend of an addition agent with a modified tall oil pitch binder wherein the addition agent constitutes at least 50 weight percent of the blend and wherein the modified tall oil pitch binder has a softening point between 30° and 125° C. and comprises from about 1 to 50 weight percent of an organic or inorganic filler and from about 50 to 99 weight percent of a tall oil pitch that is chemically modified with a polycarboxylic acid, a polyamine, a polyol, a polyisocyanate, an epoxy resin or a combination thereof.

18. The composition of claim 17 wherein the addition agent is selected from the group consisting of aluminium, boron, calcium, chromium cobalt, copper, manganese, molybdenum, molybdenum oxide, nickel, nickel oxide, niobium, nitrogen, phosphorus, selenium, silicon, tantalum, titanium, tungsten, tungsten oxide, vanadium, zirconium, and rare-earth alloys.

19. The composition of claim 18 wherein the addition agent is molybdenum oxide.

20. The composition of claim 19 wherein the filler is selected from the group consisting of sawdust, activated carbon black, wood flour, walnut shells, silicon and clay.

21. The composition of claim 20 wherein the filler is wood flour.

22. The composition of claim 17 wherein the tall oil pitch is chemically modified with maleic anhydride and diethylene triamine.

23. The composition of claim 17 wherein the tall oil pitch is chemically modified with pentaerythritol and methylene diphenylene diisocyanate.

24. The composition of claim 17 wherein the tall oil pitch is chemically modified with pentaerythritol and a styrene/maleic anhydride copolymer.

25. The composition of claim 17 wherein the tall oil pitch is chemically modified with maleic anhydride and diglycidyl ether.

26. The composition of claim 17 wherein the tall oil pitch is chemically modified with a styrene/maleic anhydride copolymer and diethylene triamine.

27. The composition of claim 17 wherein the tall oil pitch is chemically modified with maleic anhydride and a styrene/allyl alcohol copolymer.

28. The composition of claim 17 wherein the filler constitutes an amount equal to from about 5 to 30 weight percent of the modified tall oil pitch.

29. The composition of claim 17 wherein the modified tall oil pitch binder has a softening point between 55° and 85° C.

* * * * *

UNITED STATES PATENT OFFICE
CERTIFICATE OF CORRECTION

Patent No. 4,360,615                Dated November 23, 1982

Inventor(s) Samuel S. Wang, Morris E. Lewellyn

It is certified that error appears in the above-identified patent and that said Letters Patent are hereby corrected as shown below:

On the title page after the [75]

"INVENTORS: Samuel S. Wang, Chesire; Morris E. Lewellyn, Stamford, both of Conn."

should read

--INVENTORS: Samuel S. Wang, Cheshire; Morris E. Lewellyn, Stamford; and Jeno G. Szita, Norwalk, all of Conn.--

On the title page after the [73]

"ASSIGNEE: American Cyanamid Company, Stamford, Conn."

should read

--ASSIGNEE: American Cyanamid Company, Stamford, Conn., Arizona Chemical Company, New York, New York--

Signed and Sealed this

Twelfth Day of July 1983

[SEAL]

Attest:

GERALD J. MOSSINGHOFF

Attesting Officer    Commissioner of Patents and Trademarks